United States Patent [19]

Horiguchi et al.

[11] Patent Number: 5,214,128
[45] Date of Patent: May 25, 1993

[54] METHOD FOR PURIFYING A POLYPHENYLENE ETHER WITH AMINO CARBOXYLIC ACID DERIVATIVE

[76] Inventors: Koichi Horiguchi, 4-8-16. Nagauraekimae, Sodegaura-shi, Chiba-ken; Sadao Ibe, 5-29-22, Higashinakano, Nakano-ku, Tokyo; Katsuo Tsuguma, 28-213, Sakurazono-cho, Nobeoka-shi, Miyazaki-ken, all of Japan

[21] Appl. No.: 789,837

[22] Filed: Nov. 12, 1991

[30] Foreign Application Priority Data

May 21, 1990 [JP] Japan .................................. 2-129131

[51] Int. Cl.$^5$ .............................................. C08G 65/30
[52] U.S. Cl. ................................. 528/486; 528/212; 528/214; 528/215; 528/217; 528/492; 528/495; 528/496
[58] Field of Search ............... 528/486, 492, 495, 496, 528/212, 214, 215, 217

[56] References Cited

U.S. PATENT DOCUMENTS 3,951,917 4/1976 Floryan et al. .
4,460,764 7/1984 Reffert et al. .
4,463,164 7/1984 Dalton et al. .
4,654,418 3/1987 Berger et al. .

Primary Examiner—Harold D. Anderson
Attorney, Agent, or Firm—Armstrong, Westerman, Hattori, McLeland & Naughton

[57] ABSTRACT

A novel method for purifying a polyphenylene ether is disclosed. The method is characterized in that in separating a polyphenylene ether from a reaction product obtained by oxidative polymerization of a 2,6-di-substituted-phenol by means of a precipitation polymerization method in which a polymer is precipitated in the presence of a catalyst comprising a combination of a copper ion, a halide ion and not less than one type of amines and purifying a polyphenylene ether, wherein an amino carboxylic acid derivative is added to the reaction product and then a polymer is washed with a poor solvent for the polyphenylene ether.

10 Claims, No Drawings

METHOD FOR PURIFYING A POLYPHENYLENE ETHER WITH AMINO CARBOXYLIC ACID DERIVATIVE

BACKGROUND OF THE INVENTION

1. Field of the Invention

The present invention relates to a method for purifying a polyphenylene ether which is produced by oxidative polymerization of a 2,6-di-substituted-phenol.

A polyphenylene ether which is a polymer produced by oxidative polymerization of a 2,6-di-substituted-phenol has excellent mechanical properties, electrical properties, heat resistance and the like and also absorbs water poorly. Hence there has been an intense interest to use the polyphenylene ether as a thermoplastic engineering plastic.

This polyphenylene ether is generally produced by oxidative polymerization of a 2,6-di-substituted-phenol in an organic solvent. The polyphenylene ether is recovered from the polymerization solution and purified by bringing the polymerization solution in contact with a poor solvent such as methanol. The used catalyst is extracted or decomposed at the same time or before this operation is conducted.

2. Description of the Prior Art

Several methods for extracting or decomposing the catalyst have been proposed. It has been proposed to employ inorganic acids such as hydrochloric acid or organic acids such as acetic acid as a solvent for extracting or decomposing the catalyst in U.S. Pat. No. 3,630,995. It has been proposed that chelating agents such as a ethylenediaminetetraacetic acid (EDTA) and the like are added to a reaction product obtained by a solution polymerization method in U.S. Pat. Nos. 4,058,504, 3,838,102, 4,237,265, 4,110,311, 4,026,870, 3,951,917, 4,088,634, 4,116,939, 4,654,418 and 4,460,764. It has been proposed further that a reaction product obtained by a precipitation polymerization employing a specific polymerization medium is washed with chelating agents such as EDTA and the like and water in U.S. Pat. No. 4,463,164.

However, the method employing hydrochloric acid or acetic acid has the disadvantage that the obtained polymer is remarkably discolored during heat molding of the polymer. The method, in which chelating agents such as EDTA and the like are added to a reaction product obtained by a solution polymerization method, decreases the intrinsic viscosity of the polyphenylene ether during the operation of purification.

SUMMARY OF THE INVENTION

The present inventors have conducted extensive and intensive studies about a method for separating and purifying a polyphenylene ether which does not have the above-mentioned problems. As a result, the present inventors have found a method for purifying the polyphenylene ether, in which an amino carboxylic acid derivative is added to a reaction product obtained by a precipitation polymerization method and then the polymer is purified by washing with a poor solvent for the polyphenylene ether. The method has no drawback in discoloring the polymer during heat molding of the polymer and decreasing the intrinsic viscosity during the operation of purification. Thus, they have accomplished the present invention.

DETAILED DESCRIPTION OF PREFERRED EMBODIMENT

The present invention provides a method for purifying a polyphenylene ether. The method is characterized in that in separating the polyphenylene ether from a reaction product obtained by oxidative polymerization of a 2,6-di-substituted-phenol in the presence of a catalyst comprising a combination of a copper ion, a halide ion and at least one type of amines by using a precipitation polymerization method, in which a polymer is precipitated, followed by purifying the resultant polyphenylene ether, where an amino carboxylic acid derivative is added to the reaction product and then the polymer is washed with a poor solvent for the polyphenylene ether.

A 2,6-di-substituted-phenol to be employed in the method of the present invention is represented by the following general formula:

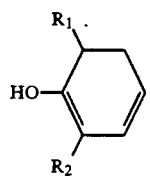

wherein $R_1$ represents a hydrocarbon residue having 1 to 4 carbon atoms; $R_2$ represents a halogen atom or a hydrocarbon residue having 1 to 4 carbon atoms.

Examples of such phenol compounds include 2,6-dimethylphenol, 2-methyl-6-ethylphenol, 2,6-diethylphenol, 2-ethyl-6-n-propylphenol, 2-methyl-6-chlorophenol, 2-ethyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol and the like. These compounds may be employed alone or in combination. In practical use, the phenol compounds may contain a small amount of o-cresol, m-cresol, p-cresol, 2,4-dimethylphenol, 2-ethylphenol and the like. Of these, 2,6-di-substituted-phenols, 2,6-dimethyl phenols is particularly preferred.

With respect to sources of a copper ion to be employed in the present invention, a cuprous salt, a cupric salt or a mixture thereof may be used.

Any cuprous and cupric compounds can be actually employed. Compounds may be selected from the viewpoints of economy and availability. Though soluble copper salts are preferred, of course, insoluble copper (cuprous and cupric) compounds can also be generally employed because these compounds form a soluble complex with the amines in the reaction mixture.

Examples of cuprous compounds to be employed in the present invention include cuprous chloride, cuprous bromide, cuprous sulfate, cuprous nitrate, cuprous azide, cuprous acetate, cuprous butyrate, cuprous toluate and the like. Examples of cupric compounds include a cupric halide such as cupric chloride and cupric bromide, cupric sulfate, cupric nitrate, cupric acetate, cupric azide, cupric toluate and the like. Of these, preferable cuprous and cupric compounds are cuprous chloride, cupric chloride, cuprous bromide and cupric bromide. These copper salts may be used by synthesizing one from an oxide, carbonate, a hydroxide or the like, and one from a halogen or a hydrogen halide. The amount of the copper compound is in the range of from 0.005 to 1.0, preferably from 0.01 to 0.5, in terms of copper gram atom per 100 moles of a 2,6-di-substituted-phenol compound.

With respect to sources of a halide ion to be employed in the present invention, an inorganic halide, a halogen, a hydrogen halide and a mixture thereof may be used. For the halide ions, chloride ions and bromide ions are particularly preferred.

Examples of the inorganic halides include alkaline metallic salts such as sodium chloride, sodium bromide, potassium chloride, potassium bromide and the like, and alkaline earth metallic salts such as magnesium chloride, magnesium bromide, calcium chloride, calcium bromide and the like. As a hylogen, chlorine and bromine may be used.

As a hydrogen halide, hydrochloric acid and hydrobromic acid may be used.

Regarding the amine component to be employed in the present invention, an amine component containing at least one type of secondary alkylenediamines, at least one type of tertiary amines and at least one type of secondary monoamines may be preferably used.

The secondary alkylenediamine is represented by the general formula as follows: ps
$R^1HN—R^2—NHR^3$ wherein $R^1$ and $R^3$ each independently represent an isopropyl group, a tertiary alkyl group having 4 to 8 carbon atoms or a cycloalkyl group having no hydrogen atom on the $\alpha$-carbon atom thereof; $R^2$ represents an alkylene group having 2 to 4 carbon atoms or a cycloalkylene group having 3 to 7 carbon atoms.

Examples of these compounds include N,N'-di-t-butylethylenediamine, N,N'-di-t-acylethylenediamine, N,N'-diisopropyl-ethylenediamine and the like. The amount of diamine to be used ranges generally from 0 to 4 mol per gram atom of copper.

Examples of tertiary amines to be employed in the present invention include tertiary aliphatic amines including tertiary alicyclic amines, such as trimethylamine, triethylamine, tripropylamine, tributylamine, triisopropylamine, diethylmethylamine, dimethylpropylamine, allyldiethylamine, dimethyl-n-butylamine, diethylisopropylamine and the like. Further, tertiary aliphatic polyamines such as a N,N,N',N'-tetraalkylethylenediamine, a N,N,N',N'-tetraalkylpropanediamine and the like may be used. Examples of tertiary aliphatic polyamines include N,N,N',N',-tetramethylethylenediamine and N,N,N',N',-tetramethyl-1,3-diaminopropane.

These tertiary amines may be employed in an amount of from 5 to 100 mols, preferably from 10 to 60 mols, per gram atom of copper.

Examples of secondary monoamines include secondary aliphatic amines such as dimethylamine, diethylamine, di-isopropylamine and di-n-butylamine; secondary cyclic hydrocarbon amines such as dicyclohexylamine; secondary alicyclic amines such as piperidine, piperazine and morpholine; secondary alkanolamines such as diethanolamine and di-iso-propanolamine; N-alkylalkanolamine such as N-methylethanolamine, N-ethylethanolamine and N-t-butylethanolamine; and N-arylalkanolamines such as N-phenylethanolamine. The amount of the secondary monoamine is in the range of from 0.05 to 10 mols, preferably from 0.1 to 5 mols, per 100 mols of a 2,6-di-substituted-phenol.

A quarternary ammoniumsalt and a surfactant may be added to the reaction system in order to increase the reaction rate, control the particle size of the polymer and improve the phase separation between the solvents.

When the reaction temperature is too low, the reaction proceeds slowly. On the other hand, when the reaction temperature is too high, the catalyst is inactivated. Accordingly, the reaction temperature is generally in the range of from 0° to 80° C., preferably from 10° to 60° C.

As oxygen, a pure oxygen gas, a mixed gas comprising oxygen gas and an inert gas such as nitrogen gas, in arbitrary proportions, air and the like may be employed. For pressure, atmospheric or a superatomospheric pressure may be employed.

A polymerization medium to be employed in the method of the present invention is not particularly limited insofar as a polymerization is conducted in the precipitation polymerization. The medium has stronger resistance to oxidation than a 2,6-di-substituted-phenol to be oxidized, and does not react with various radicals which are occurring during the reaction process. However, media are preferred, which are capable of dissolving therein the 2,6-disubstituded-phenol as well as a polymerization catalyst. For example, an aromatic hydrocarbon such as benzene, toluene, ethylbenzene and xylene; a halogenated hydrocarbon such as chloroform, 1,2-dichloroethane, trichloroethane, chlorobenzene and dichlorobenzene; a nitro compound such as nitrobenzene; and the like, may be employed as a good solvent for a polymer. Examples of poor solvents for the polymer include an alcohol such as methanol, ethanol, propanol, butanol, benzyl alcohol and cyclohexanol; a ketone such as acetone and methyl ethyl ketone; an ester such as ethyl acetate and ethyl formate; an ether such as tetrahydrofuran and diethyl ether; an amide such as dimethylformamide; and the like. In the present invention, these good and poor solvents may be employed as a good-poor solvents pair comprising one solvent of each type or in mixtures comprising at least two different solvents of one type. By selecting a mixing ratio of the good solvent for the polymer to the poor solvent, a precipitation polymerization method is conducted, in which the polymer precitates as particles in the reaction system in accordance with the advance of the reaction. The ratio of the good solvent to the poor solvent is in the range of from 3:7 to 9:1 by weight, preferably from 4:6 to 8:2 by weight. In the precipitation polymerization, the particles of the polymer, which have an average particle diameter of from 1 to 3000 $\mu$m and a narrow particle diameter distribution, are obtained. The particles are controlled to form into a suitable shape for washing in order to remove catalytic metal.

The present invention may be applied to both a batch polymerization method and a continuous polymerization method. An application of the present invention to a continuous process of a precipitation polymerization method is preferred, because not only polymerization activity is high but also a pure white polymer having a narrow molecular weight distribution and exhibiting little color change by heating can be obtained.

An example of a continuous process of a precipitation polymerization method is disclosed in U.S. Pat. No. 3,789,054.

Namely, in the above-mentioned continuous process, two polymerization tanks of a complete mixing type, each which has a different function, are employed in combination in order to continuously obtain a polyphenylene ether by a polymerization reaction of a phenol compound, wherein a polyphenylene ether precipitates with the progress of the reaction. This requires a first polymerization tank in which polymerization is advanced in a state of uniform solution and a second polymerization tank in which stable particles of a polyphenylene ether are allowed to separate out. Further, if necessary, a third polymerization tank is set up and therein the polymer particles are finished up by aging and controlling the ultimate properties so as to be subjected to after-treatment processes. Each of these polymerization tanks may be divided into a plurality of tanks in order to conduct more delicate controls.

Now, the above-mentioned tanks are described in more detail. For the first polymerization tank, there may be employed a type of tank wherein the flow rate of an oxygen gas and the average residence time of the reaction mixture are controlled so as to suppress the degree of the monomer conversion to 90% or less in order to prevent any polymer from separating out, and that concurrently the heat of polymerization is sufficiently removed by utilizing the feature that the reaction mixture is an uniform solution whose viscosity is not much increased. In the second polymerization tank, the polymer particles which separate out may be prevented from adhering to the wall of the tank, the agitating element and the like by controlling the composition media, that is, by choosing a good/poor solvent combination and their weight to weight ratio and concurrently the size and rigidity of the polymer particles are controlled by keeping the appropriate agitation state of the reaction medium and feeding rate of the oxygen gas.

The third polymerization tank often plays an important role as an aging tank to give the polymer particles such a size and rigidity as to be suitable for filtration and drying in the after-treatment process. In this third polymerization tank, the agitation condition and residence time are precisely controlled.

The most preferable range of the operating conditions of this continuous polymerization method can be selected by depending on the types of the catalyst, the 2,6-di-substituted-phenol and the medium, especially the concentration of the monomer, 2,6-di-substituted-phenol. For example, the monomer concentration may be from 10 to 40% by weight based on the total amount of the solution for polymerization, which is different from the case of using an uniform solution polymerization. Particularly, it is preferable that the monomer concentration is from 20 to 35% by weight, because the feature of the continuous polymerization in a precipitation forming system is well exhibited in this range.

The reason why a complete mixing type of the polymerization tank is employed as a polymerization tank in this method is that sufficient agitation should be conducted in all the reaction tanks since the oxidative polymerization reaction of a 2,6-di-substituted-phenol is required to raise the contacting efficiency of the 2,6-di-substituted-phenol with the oxygen gas. Namely, any polymerization tank in which agitation of the reaction mixture does not occur in the direction of the flow of the mixture is not appropriate in case where a reaction mixture having a viscosity as low as one used in the present reaction.

In other words, as mentioned above, at least two complete mixing type of reaction tanks should be combined in order to conduct this polymerization method, which reaction tanks have an average residence and agitation state so as to exhibit functions as a reaction tank.

The term "aminocarboxylic acid derivative" used in the present invention means a polyalkylene polyamine polycarboxylic acid, cycloalkylene polyamine polycarboxylic acid, polyalkylene ether polyamine polycarboxylic acid, aminopolycarboxylic acid, aminocarboxylic acid, an alkali metallic salt of these acid, an alkali earth metallic salt of these acid, a mixture salt of alkali metal and alkali earth metal of these acid, and the like. These aminocarboxylic acid derivatives may be employed alone or in combination. Among the above-mentioned compounds belonging to aminocarboxylic acid derivatives, preferable examples include ethylene diamine tetraacetic acid, nitrilotriacetic acid, iminodiacetic acid, glycine, diethylene triamine pentaacetic acid, triethylene tetraamine hexaacetic acid, 1,2-diaminocyclohexane tetraacetic acid, N-hydroxyethyletylene diamine-N·N'·N'-triacetic acid, ethylene glycol diethylether diamine tetraacetic acid, ethylene diamine tetrapropionic acid and their salts. Particularly, ethylene diamine tetraacetic acid (hereinafter, referred to as "EDTA") and its salts, nitrilotriacetic acid and its salts, diethylene triamine pentaacetic acid and its salts, and the like are more preferable. With respect to salts of EDTA, di-, tri-, and tetra-sodium salts of EDTA and di-, tri-, and tetra-potassium salts of EDTA are preferable. These aminocarboxylic acid derivatives are usually employed as aqueous solution having a concentration of in the range of from 5 to 50% by weight. With respect to an amount of aminocarboxylic acid derivatives, a mole ratio of aminocarboxylic acid derivatives to a metallic ion contained in the reaction product as a catalyst is in the range of from 1:1 to 10:1, preferably from 1:1 to 5:1.

In the present invention, there are two preferable methods for removing a catalytic metal by adding a aminocarboxylic acid derivative to a reaction product obtained by a precipitation polymerization method. In one method, a catalytic metal is removed by adding only aqueous solution of the aminocarboxylic acid derivative to the reaction product and filtering a mixture of the reaction product and aqueous solution of aminocarboxylic acid derivative without a phase separation of an organic phase and an aqueous phase. In the other method, a catalytic metal is removed by separating an organic phase in which a polyphenylene ether is suspended from an aqueous phase by adding a solution of the aminocarboxylic acid derivative and an appropriate amount of water to the reaction product. Either method may be employed in the present invention. However, in the method with a phase separation, it is difficult to separate the organic phase in which the polyphenylene ether is suspended from an aqueous phase when the polyphenylene ether in the reaction product has a high concentration over 20% by weight so that the purification of the polymer is insufficient. Accordingly, the method comprising a phase separation is industrially disadvantageous because a concentration of the polyphenylene ether in the reaction product must be lowered. Further, the method comprising a phase separation is economically disadvantageous because purification treatment or the thermal disposal of the aqueous phase to be separated is required. Therefore, the method without a phase separation is preferred.

In the present invention, after the addition of an aminocarboxylic acid derivative to a reaction product, the polyphenylene ether is further purified by washing with a poor solvent for the polyphenylene ether. As a poor solvent for the polyphenylene ether, a solvent, which does not dissolve the polyphenylene ether but dissolve a chelate of an aminocarboxylic acid derivative and a catalytic metal, is employed in the present invention. The poor solvents having the high solubility of the chelate of the aminocarboxylic acid derivative and the catalytic metal is preferred since the higher the solubility of the chelate of the aminocarboxylic acid derivative and the catalytic metal in the poor solvent is, the higher is the washing efficiency. Examples of such poor solvents include alcohols such as methanol, ethanol, n-propanol, iso-propanol, n-butanol, sec-butanol, iso-butanol, tert-butanol, benzyl alcohol, cyclohexanol and the like; ketons such as aceton and methyl ethyl keton; esters such as ethyl acetone and ethyl formate; ethers such as tetrahydrofuran and diethyl ether; and amides such as dimethylformamide. Of these poor solvents, methanol is preferred. The object of washing with the poor solvent for the polyphenylene ether is to extract into the poor solvent the residual chelate of the aminocarboxylic acid derivative and the catalytic metal from the polyphenylene ether. Therefore, the more of the poor solvent to be employed and the more times the wash is conducted, the less is the amount of the catalytic metal in the polymer. However, it is economically disadvantageous to employ an excessive amount of the poor solvent and to conduct the washing too many times. When the amount of the poor solvent is the same, it is preferred to divide the amount and increase the number of washing because the amount of the catalytic metal in the polymer decreases. In the present invention, there are not any limitations of washing conditions such as an addition speed of the poor solvent, an addition order and the like to control the properties of the polymer particles since the shape of the polymer particles is maintained when the poor solvent is added for the washing. The amount of the poor solvent for the polyphenylene ether to be employed is from one to ten times, preferably from one to seven times the dry weight of the polyphenylene ether in the reaction product. The washing of the polyphenylene ether with the poor solvent for the polyphenylene ether ranges from one to ten times, preferably two to seven times.

It is preferable that the washing with the poor solvent is conducted after the separation of the polyphenylene ether from a reaction product.

Preferably, the washing is conducted at a temperature range of from 20° to 60° C.

In the method of the present invention, a reducing agent may be employed when an aminocarboxylic acid derivative is added to the reaction product obtained by oxidative polymerization of 2,6-di-substituted-phenol. As the reducing agent to be employed, any reducing agents may be employed. However, particularly preferred examples of reducing agents include sodium dithionite, sodium sulfite, hydrazine, hydroquinone and the like. The reducing agent is added either before or after the aminocarboxylic acid derivative is added to the reaction product, or at the same time as the aminocarboxylic acid derivative is added to the reaction product. The amount of the reducing agent to be employed is in the range of from 0.01 to 5% by mol, preferably from 0.05 to 3% by mol, based on an amount of the 2,6-di-substituted-phenol.

The present invention will now be described in more detail with reference to the following examples which by no means limit the scope of the invention.

Definition of Color Index 0.5 g of a polymer which has undergone compression molding at 310° C. is dissolved in chloroform. The volume of the resultant solution is adjusted to 100 ml in total, the absorbency at 480 nm of the sample solution is measured at 25° C., and the color index of the polymer is calculated according to the formula as shown below.

A color index value is used as a measure by which the degree of thermal oxidation of a polyphenylene ether is evaluated. The lower this value is, the slighter is the coloring of the polymer by heating and the stabler the polymer is towards thermal oxidation.

*Color index* $= \log(I_0/I)/a \cdot b \times 100$ wherein
$I_0$: intensity of incident light
$I$: intensity of transmitted light
$a$: length of cell (cm)
$b$: concentration of sample solution (g/cm$^3$)

EXAMPLE 1

100 g (0.82 mol) of 2,6-dimethylphenol was dissolved in a solvent mixture of 240 g of xylene, 80 g of butanol and 80 g of methanol. A polymerization reaction solution of Poly-(2,6-dimethyl-1,4-phenylene) ether was obtained by conducting oxidative polymerization at 25° C. for 6 hours in the presence of a catalyst of $Cu_2O$-HBr-di-n-butylamine-dimethyl-n-butylamine-N,N'-di-t-butylethyldiamine type and trioctylmethylammonium chloride. Amounts of the catalysts were 0.100 g ($7.0 \times 10^{-4}$ mol) of $Cu_2O$, 0.458 g ($5.7 \times 10^{-3}$ mol) of HBr, 0.996 g ($7.7 \times 10^{-3}$ mol) of di-n-butylamine, 3.644 g ($3.6 \times 10^{-2}$ mol) of dimethyl-n-butylamine and 0.155 g ($9.0 \times 10^{-4}$ mol) of N,N'-di-t-butylethyldiamine. $Cu_2O$ was fed as a solution of 48% aqueous HBr in which $Cu_2O$ was dissolved. An amount of trioctylmethylammonium chloride was 0.11 g (0.022% by weight based on an amount of the polymerization solution).

The resulting polymerization mixture is a suspension in which polymer particles precipitated.

2.27 g ($2.8 \times 10^{-2}$ mol) of 50% aqueous EDTA·3K was added to the resultant polymerization suspension. Further, 160 g of methanol was added to suspension in order to wash the polymer. After the solution was stirred at 45° C. for 30 minutes, a polymer which was wet with a solvent was obtained by filtering the mixture. By adding 240 g of methanol to the polymer, a methanol suspension was obtained. After stirring the suspension at 45° C. for 30 minutes, a polymer was obtained by filtering the stirred suspension. Hereafter, the same process was repeated twice and then the resultant polymer which was wet with a solvent was dried at 150° C. for 1 hour.

The intrinsic viscosity of the ultimate polymer was measured at 30° C. in chloroform. The value was 0.57. The amount of residual copper in the polymer was 0.5 ppm. The color index of a molded article, which was obtained by compression molding at 310° C., was 3.0.

After the stage of the above operation, wherein 50% aqueous EDTA·3K was added to the polymerization reaction solution, one mixture was left at 45° C. for 5 hours and the other was left at the same temperature for 24 hours. After that, the operation was continued. After finishing the operation, intrinsic viscosities of the ultimate polymers were measured. The intrinsic viscosity of the polymer which was left for 5 hours during the operation was 0.57. The intrinsic viscosity of the polymer which was left for 24 hours was 0.57. There was no difference between the intrinsic viscosities of these polymers.

COMPARATIVE EXAMPLE 1

11.6 g ($1.1 \times 10^{-1}$ mol) of 35% hydrochloric acid and 100 g of water were added to the resultant polymerization reaction suspension which was obtained by the same operation as Example 1. After the suspension was stirred at 45° C. for 30 minutes, an aqueous phase was removed by leaving the suspension at rest. 160 g of methanol was added to the resultant solution, followed by stirring at 45° C. for 30 minutes. A polymer which was wet with a solvent was obtained by filtering the resultant solution. By adding 240 g of methanol to the polymer, a suspension was obtained. After the suspension was stirred at 45° C. for 30 minutes, a polymer was obtained by filtering the stirred suspension. Hereafter, the same process was repeated twice and the obtained polymer which was wet with the solvent was dried at 150° C. for 1 hour.

The intrinsic viscosity of the ultimate polymer was measured at 30° C. in a solvent of chloroform. The value was 0.57. The amount of residual copper in the polymer was 1.0 ppm. The color index of a molded article, which was obtained by compression molding at 310° C., was 6.0.

After the stage of the above operation, wherein 35% hydrochloric acid and water was added to the resultant polymerization reaction suspension, one mixture was left at 45° C. for 5 hours and the other was left at the same temperature for 24 hours. After that, the operation was continued. After finishing the operation, intrinsic viscosities of the ultimate polymers were measured. The intrinsic viscosity of the polymer which was left for 5 hours during the operation was 0.57. The intrinsic viscosity of the polymer which was left for 24 hours was 0.57.

COMPARATIVE EXAMPLE 2

The same operation as Example 1 was conducted except that the polymerization solvent comprised 300 g of xylene instead of xylene, butanol and methanol. The obtained polymerization reaction product was an uniform solution containing a polymer. The intrinsic viscosity of the obtained polymer was measured at 30° C. in chloroform. The value was 0.55. The amount of residual copper in the polymer was 1.5 ppm. The color index of a molded article, which as obtained by compression molding at 310° C., was 3.5.

After the stage of the above operation, wherein 50% aqueous EDTA·3K was added to the polymerization reaction solution, one mixture was left at 45° C. for 5 hours and the other was left at the same temperature for 24 hours. After that, the operation was continued. After finishing the operation, intrinsic viscosities of the ultimate polymers were measured. The intrinsic viscosity of the polymer which was left for 5 hours during the operation was 0.48. The intrinsic viscosity of the polymer which was left for 24 hours was 0.38. The decrease of molecular weight was admitted.

EXAMPLE 2

The same operation as example 1 was conducted except that 4.12 g ($2.8 \times 10^{-3}$ mol) of 25% aqueous EDTA·3Na was employed instead of EDTA·3K. The intrinsic viscosity of the obtained polymer was measured at 30° C. in a solvent of chloroform. The value was 0.57. The amount of residual copper in the polymer was 0.6 ppm. The color index of a molded article which was obtained by compression molding at 310° C., was 3.2.

After the stage of the above operation, wherein 25% aqueous EDTA·3Na was added to the polymerization reaction solution, one mixture was left at 45° C. for 5 hours and the other was left at the same temperature for 24 hours. After that, the operation was continued. After finishing the operation, intrinsic viscosities of the ultimate polymers were measured. The intrinsic viscosity of the polymer which was left for 5 hours during the operation was 0.57. The intrinsic viscosity of the polymer which was left for 24 hours was 0.57. There was no difference between the intrinsic viscosities of these polymers.

EXAMPLE 3

The same operation as Example 1 was conducted except that 0.18 g of hydroquinone ($1.64 \times 10^{-3}$ mol) was added after the addition of EDTA·3K. The intrinsic viscosity of the obtained polymer was measured at 30° C. in chloroform. The value was 0.57. The amount of residual copper in the polymer was 0.7 ppm. The color index of a molded article which was obtained by compression molding at 310° C., was 2.6.

After the stage of the above operation, wherein 50% aqueous EDTA·3K was added to the polymerization reaction solution, one mixture was left at 45° C. for 5 hours and the other was left at the same temperature for 24 hours. After that, the operation was continued. After finishing the operation, intrinsic viscosities of the ultimate polymers were measured. The intrinsic viscosity of the polymer which was left for 5 hours during the operation was 0.57. The intrinsic viscosity of the polymer which was left for 24 hours was 0.57. There was no difference between the intrinsic viscosities of these polymers.

EXAMPLE 4

The same operation as Example 1 was conducted except that a catalyst of oxidative polymerization comprised 0.085 g ($5.0 \times 10^{-4}$ mol) of cupric chloride, 0.37 g ($3.6 \times 10^{-3}$ mol) of 35% hydrochloric acid, 1.09 g ($8.5 \times 10^{-3}$ mol) of di-n-butylamine and 3.31 g ($2.5 \times 10^{-2}$ mol) of N,N,N',N'-tetramethyl-1,3-diaminopropane. The intrinsic viscosity of the obtained polymer was measured at 30° C. in a solvent of chloroform. The value was 0.55. The amount of residual copper in the polymer was 0.3 ppm. The color index of a molded article which was obtained by compression molding at 310° C., was 2.4.

After the stage of the above operation, wherein 50% aqueous EDTA·3K was added to the polymerization reaction solution, one mixture was left at 45° C. for 5 hours and the other was left at the same temperature for 24 hours. After that, the operation was continued. After finishing the operation, intrinsic viscosities of the ultimate polymers were measured. The intrinsic viscosity of the polymer which was left for 5 hours during the operation was 0.55. The intrinsic viscosity of the polymer which was left for 24 hours was 0.55. There was no difference between the intrinsic viscosities of these polymers.

As above described, a polyphenylene ether, which is slightly discolored during heat molding and of which an intrinsic viscosity is not decreased during the operation of purification, may be produced by means of the present invention.

What is claimed is:

1. A method for removing catalyst composition from a polyphenylene ether reaction product produced by the oxidative polymerization reaction of a 2,6-di-substituted phenol in a reaction mixture containing a catalyst composition comprising copper ion, halide ion, and at least one amine, wherein the polyphenylene ether reaction product precipitates as particles in the reaction mixture, which consists of adding an amino carboxylic acid derivative to the polyphenylene ether reaction product particles and washing the polyphenylene ether reaction product particles to which the amino carboxylic acid derivative has been added with a poor solvent for polyphenylene ether.

2. The method of claim 1, wherein the polymerization reaction is a continuous reaction.

3. The method of claim 1, wherein the polyphenylene ether reaction product is washed 1–10 times with the poor solvent.

4. The method of claim 1, wherein the 2,6-di-substituted-phenol is 2,6-dimethylphenol.

5. The method of claim 1, wherein the amino carboxylic acid derivative is a di-, tri- or tetrasodium salt of ethylenediaminetetraacetic acid.

6. The method of claim 1, wherein the amino carboxylic acid derivative is a di,- tri- or tetrapotassium salt of ethylenediaminetetraacetic acid.

7. The method of claim 1, wherein the poor solvent for the polyphenylene ether is an alcohol.

8. The method of claim 7, wherein the alcohol is methanol.

9. The method of claim 1, wherein the amount of the poor solvent is from one to ten times the dry weight of the polyphenylene ether.

10. The method of claim 1, wherein the polyphenylene ether is separated from the polyphenylene ether reaction product by filtration prior to washing.

* * * * *